United States Patent [19]

Saito et al.

[11] Patent Number: 4,975,715

[45] Date of Patent: Dec. 4, 1990

[54] THERMAL PRINTER HAVING IMAGE EDITING FUNCTION

[75] Inventors: Masao Saito, Fujisawa; Tsutomu Masuda, Tokyo, both of Japan

[73] Assignee: Kabushiki Kaisha Toshiba, Kawasaki, Japan

[21] Appl. No.: 407,737

[22] Filed: Sep. 15, 1989

[30] Foreign Application Priority Data

Oct. 28, 1988 [JP] Japan ................................ 63-272585

[51] Int. Cl.[5] ........................ G01D 15/10; G03G 21/00

[52] U.S. Cl. ................................ 346/1.1; 346/76 PH; 355/202; 355/218

[58] Field of Search ........................... 346/1.1, 76 PH; 355/202, 218

[56] References Cited

U.S. PATENT DOCUMENTS 4,663,637 5/1987 Saitou ............................. 346/76 PH 4,914,475 4/1990 Sugishima et al. ................. 355/202

*Primary Examiner*—George H. Miller, Jr.

*Assistant Examiner*—Gerald E. Preston

*Attorney, Agent, or Firm*—Foley & Lardner, Schwartz, Jeffery, Schwaab, Mack, Blumenthal & Evans

[57] ABSTRACT

A position in which an image of a second document is inserted into an image of a first document is designated by operating an operation panel. A scanner unit reads the image of the first document and a printing unit prints the read image of the first document on paper. That area of the first document image to be printed by the printing unit in which the image of the second document is inserted is masked. Paper on which the first docment image has been printed and an ink ribbon are set back to a position at which the printing operation for the first document image is started before the second document image is printed. The scanner unit reads the second document image and the printing unit prints the second document image read on a designated area of the paper on which the first document image has been printed by using ink of that portion of the ink ribbon which has not been used for printing the first document image.

14 Claims, 7 Drawing Sheets

THERMAL PRINTER HAVING IMAGE EDITING FUNCTION

BACKGROUND OF THE INVENTION

1. Field of the Invention

This invention relates to a printer for forming desired images by transferring ink from an ink ribbon to paper according to a heat transfer method, and more particularly to a thermal printer having an image editing function for printing an image on a portion of an image which has previously been printed.

2. Description of the Related Art

A black-and-white thermal printers have an image editing function for printing a second image on part of a first image previously printed. In order to print an image on paper, the thermal printer necessitates an ink ribbon of the same size as the printing paper so that, in order to print two images on the printing paper by utilizing the image editing function, it becomes necessary to provide an ink ribbon corresponding to two sheets of printing paper.

A color thermal printer has been developed which is of such a type as disclosed, for example, in U.S. Pat. No. 4,663,637.

However, no such image editing function has yet been provided for color thermal printers, though it has been considered to provide the image editing function for the color printer.

However, an ink ribbon used for the color thermal printer includes yellow, cyan, magenta and black ink areas which are sequentially arranged and each of which has substantially the same size as the printing paper, and it is necessary to selectively use yellow, cyan, magenta and black inks. Since it is necessary to provide an ink ribbon corresponding to two sheets of printing paper in the case where the image editing function is provided for the color thermal printer, it becomes economically disadvantageous.

SUMMARY OF THE INVENTION

An object of this invention is to provide a thermal printer capable of printing an image on part of the printing paper on which an image has previously been printed by using an ink ribbon corresponding to one sheet of printing paper.

The above object can be attained by a thermal printer for printing an image by transferring ink from an ink ribbon to an object member, comprising;

means for designating a position in which a second image is printed on part of a first image;

means for modifying the first image by masking that part of the first image which corresponds to the printing position of the second image designated by the designating means; and means for printing the first image created by the modifying means by transferring ink to the object member and for printing the second image on the object member on which the first image has been printed, by using ink of that portion of the ink ribbon used for printing the first image which corresponds to the masked portion of the first image.

According to this invention, since the portion of the ink ribbon which has not been used for printing an image is used to print another image, two images can be printed by use of an ink ribbon for one sheet of paper and thus the ink ribbon can be effectively used.

DETAILED DESCRIPTION OF THE PREFERRED EMBODIMENTS

There will now be described an embodiment of this invention with reference to the accompanying drawings.

Figure 1:
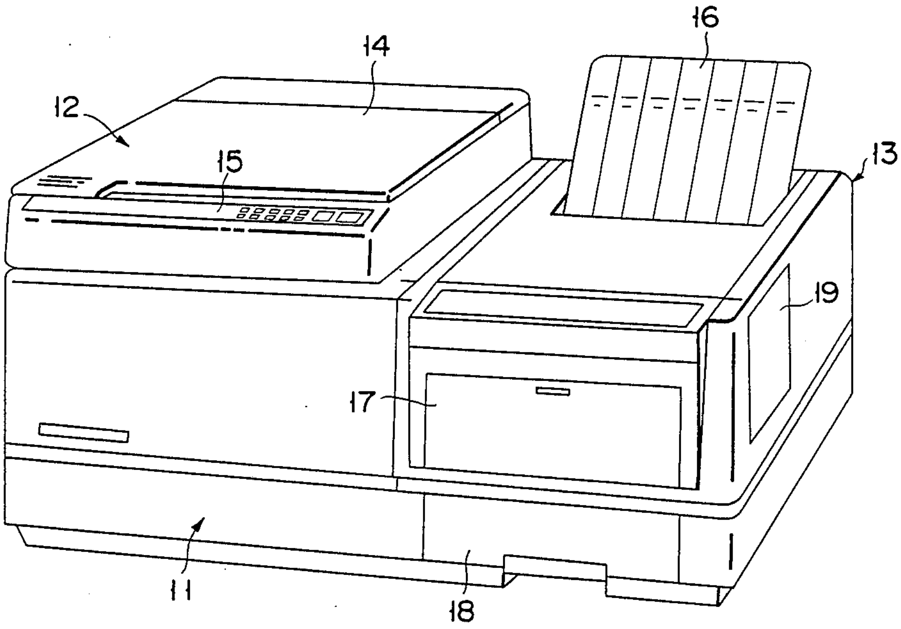
FIG. 1 is a perspective view of an image forming device according to one embodiment of this invention.

As shown in FIG. 1, scanner unit 12, for reading the image of a document, is mounted on the main portion of the printer and printing unit 13, for printing the image of the document read by scanner unit 12 on printing paper, is disposed adjacent to scanner unit 12. Cover 14 for covering a document table and operation panel 15 are disposed on the upper portion of scanner unit 12.

Discharging tray 16 is disposed on the upper portion of printing unit 13. Door 17, which is set in the open state when printing paper is manually supplied, and paper-supply cassette 18 containing printing paper are disposed on the front portion of printing unit 13, and door 19 can be set in an open or closed state, for permitting an ink ribbon cassette which will be described later to be inserted or removed.

Figure 2:
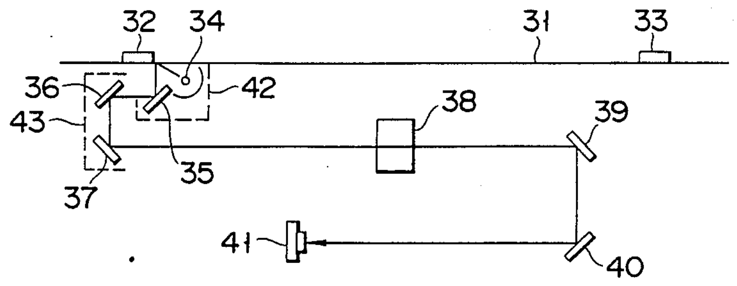
FIG. 2 is a diagram schematically showing the arrangement of the scanner unit shown in FIG. 1.

FIG. 2 shows the construction of scanner unit 12. Document table 31, on which a document is set, is covered with document table cover 14. Scales 32 and 33, used for determining the reference of the document setting positions, are provided at both ends of document table 31.

Light-exposure lamp 34, for emitting light onto the document set on document table 31, is disposed on the rear side of document table 31. Light emitted from light-exposure lamp 34 is reflected by the document and directed to CCD line sensor 41 via mirrors 35, 36 and 37, variable-power lens block 38, and mirrors 39 and 40.

Light-exposure lamp 34 and mirror 35 are mounted on first carriage 42 and mirrors 36 and 37 are mounted on second carriage 43. Light-exposure lamp 34 and mirror 35 are mounted so as to reciprocally move between both end portions of document table 31 in the lengthwise direction and mirrors 36 and 37 are mounted so as to move through a distance which is ½ of the traveling distance of, and in accordance with the movement of, light-exposure lamp 34 and mirror 35.

Variable magnification lens block 38 can be moved along the optical axis according to the image forming magnification.

CCD line sensor 41 is a color CCD line sensor having yellow, cyan and magenta filters.

Figure 3:
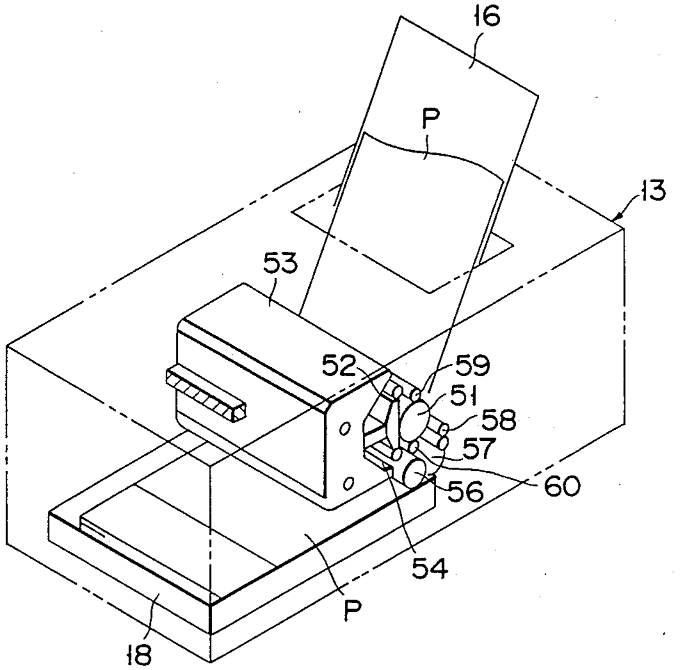
FIG. 3 is a perspective view of the main portion of the printer unit shown in FIG. 1.
Figure 4:
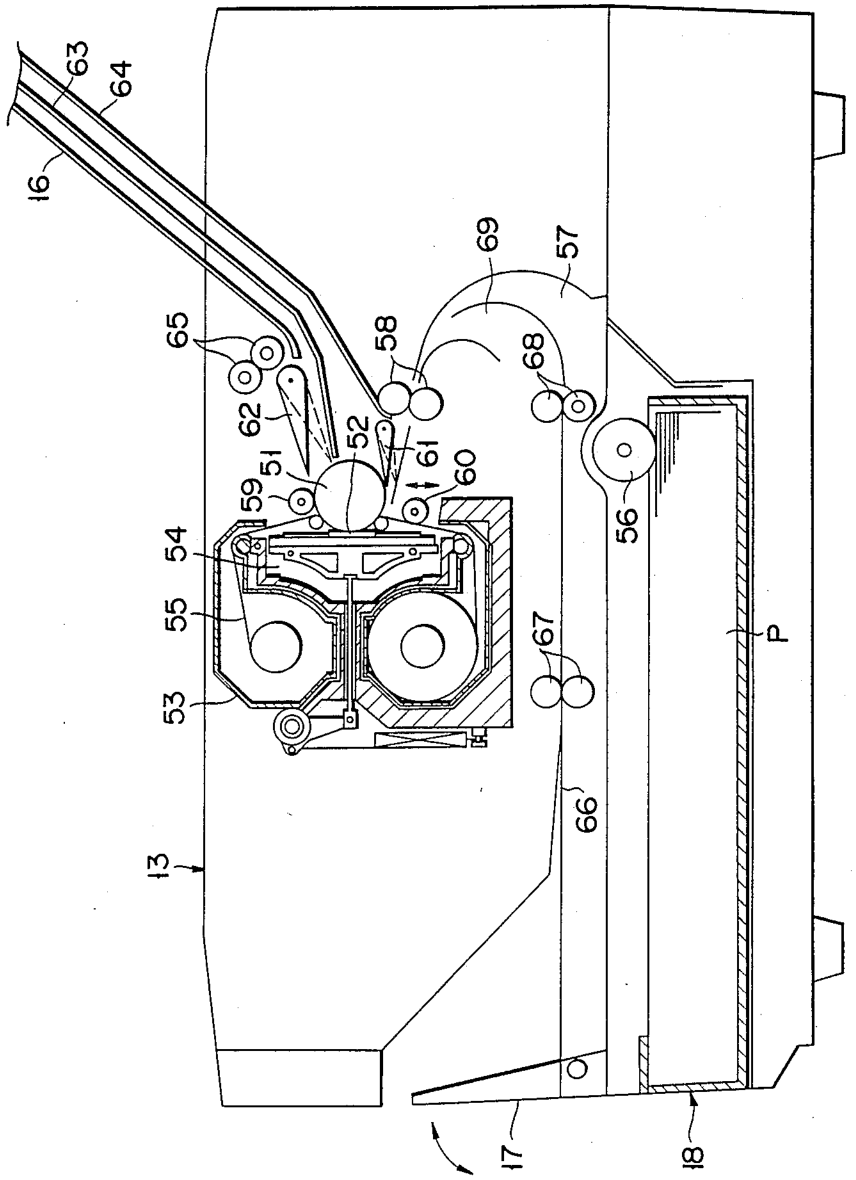
FIG. 4 is a cross sectional view of the printer unit shown in FIG. 1.

FIGS. 3 and 4 show the construction of printing unit 13. Platen roller 51 is mounted on the central portion of printing unit 13. Thermal head 52 is disposed so that it can be set either in contact with or apart from platen roller 51. Ink ribbon 55 is contained in ribbon cassette 53. Ribbon cassette 53 has receiving portion 54 which permits ink ribbon 55 to be exposed and, when ribbon cassette 52 is inserted into printing unit 13, receives thermal head 52. In the printing operation, ink ribbon 55 is pressed against platen roller 51 by means of thermal head 52. Thermal head 52 has a plurality of heat generating elements (not shown) arranged along the lengthwise direction of platen roller 51. When the heat generating elements are energized according to an image to be printed, the ink of ink ribbon 55 is melted and transferred to the printing paper held between ink ribbon 55 and platen roller 51.

Paper supply cassette 18 is disposed below ribbon cassette 53. Take-up roller 56 takes up paper P received in paper supply cassette 18 and feeds the same to resist roller 58 via feeding path 57. Resist roller 58 feeds the paper between platen roller 51 and ink ribbon 55. Paper fed to platen roller 51 and ink ribbon 55 continues to be fed while it is being held therebetween. Press rollers 59 and 60 are mounted so as to be pressed against or set apart from platen roller 5 by the action of a solenoid (not shown). Press rollers 59 and 60 act to press paper against platen roller 51. In the printing operation, platen roller 51 and ink ribbon 55 are driven with paper pressed against platen roller 51 by press rollers 59 and 60, so as to feed the paper from the lower portion to the upper portion, according to the drawing. In this way, paper can be correctly fed or carried by pressing the paper against platen roller 5 by means of press rollers 59 and 60.

Gate 61 is disposed between resist roller 58 and platen roller 51, and gate 62 is disposed between platen roller 51 and paper discharging tray 16. Gates 61 and 62 function to feed the paper to and from first guide 63 or second guide 64 disposed on the rear side of paper discharging tray 16, during the color printing operation. Paper discharging rollers 65 disposed near gate 62 discharge the printed paper on to paper discharging tray 16. Gates 61 and 62 are driven by a solenoid (not shown).

Manual paper feeding path 66 is arranged above paper supply cassette 18. Feed rollers 67 and 68, disposed in manual paper feeding path 66, set door 17 into the open state and feed the manually supplied paper. Feed rollers 67 and 68 feed paper to resist roller 58 via feeding path 69.

Figure 5:
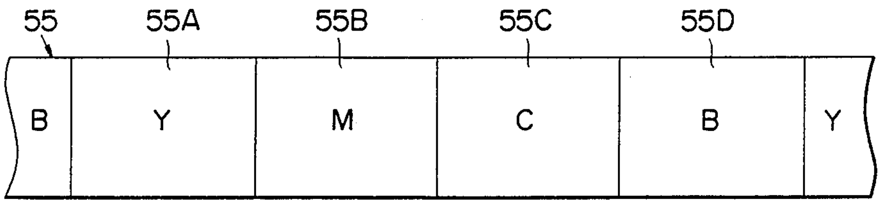
FIG. 5 is a plan view showing an ink ribbon.

FIG. 5 shows the construction of ink ribbon 55.

Ink ribbon 55 has color ink areas which are of substantially the same size as a sheet of paper and are sequentially arranged. For example, the color ink areas include yellow (Y) ink area 55A, magenta (M) ink area 55B, cyan (C) ink area 55C and black (B) ink area 55D. When a color image is printed, the four color ink areas are used.

That is, the image is printed on paper in ink of yellow ink area 55A, and the paper is set back to the print starting position after the image forming process by ink of yellow ink area 55A is completed. In this state, the image is printed in ink of magenta 55B. After this, in the same manner as described above, the paper is set back to the print starting position each time the image is printed in one color ink and the image is printed in ink of cyan ink area 55C or black ink area 55D. The printing operation will be described later in detail.

Figure 6:
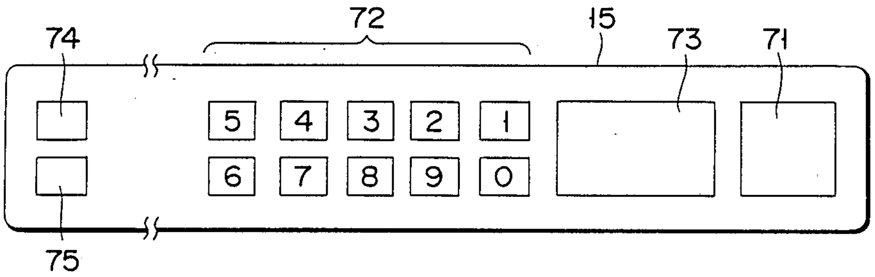
FIG. 6 is a plan view showing the main portion of an operation panel.

FIG. 6 shows the main portion of operation panel 15 disposed on scanner unit 12. Print key 71 is used to specify initiation of the printing operation. Ten keys 72 are operated to set the number of sheets of paper to be printed. Ten keys 72 are also operated to input the coordinate values of corner portions of a desired area as numeral data in a case where the desired area of a document is specified in the image editing mode which will be described later. Display unit 73 displays the number of paper sheets to be printed, the coordinate values and the like. Mode key 74 is used to set the image editing mode and determination key 75 is operated to determine the coordinate values input by operating ten keys 72 in the image editing mode.

Figure 7:
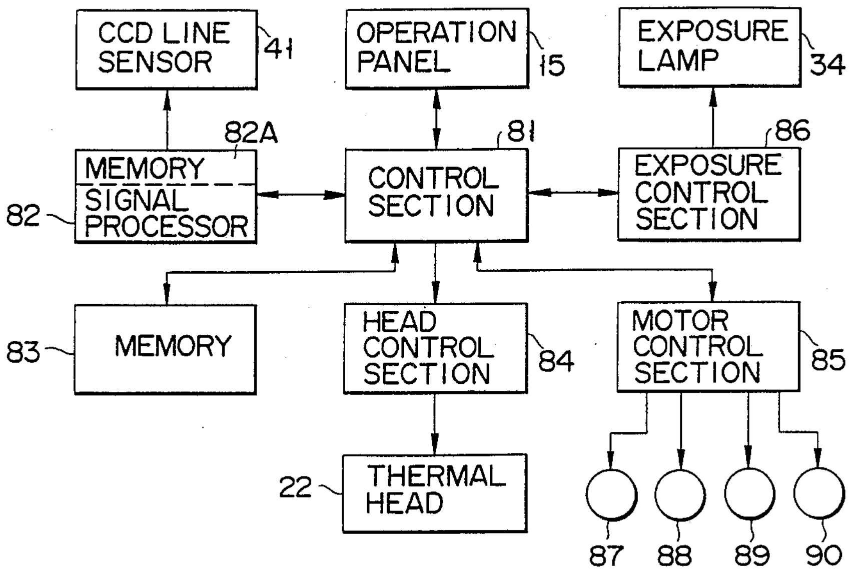
FIG. 7 is a block diagram showing a control system.

FIG. 7 shows the construction of the control system of the printer.

Control section 81 is used for the general control operation of the printer. Control section 81 is connected to operation panel 15, signal processor 82, memory 83, head control section 84 and motor control section 86. Signal processor 82 has memory 82A for storing image information output from CCD line sensor 82A. Signal processor 82 forms image information corresponding to yellow, magenta, cyan and black images based on image information stored in memory 82A. Memory 83 stores a program for determining the operation of control section 81 and coordinate values. Head control section 84 drives thermal head 52 according to printing information. Motor control section 85 controls the operation of motor 87 for driving light-exposure lamp 34, motor 88 for driving variable-magnification lens block 38, and motor 89 for driving platen roller 51, take-up roller 56, resist roller 58 and the like, and motor 90 for driving ink ribbon 55. Light-exposure control section 86 controls the exposure operation of light-exposure lamp 34.

Now, the operation of the device of the above construction will be explained.

First, a normal printing operation will be explained.

A document is set on document table 31 of reading device 12 and ten keys 72 of operation panel 15 are operated to set the number of sheets of paper to be printed. If, in this condition, print key 71 is depressed, a command is generated from control section 81 to exposure control section 86 to turn on exposure lamp 34. At this time, a command is supplied from control section 34 to motor control section 85 so that motors 87, 89 and 90 can be driven by motor control section 81. As a result, the image of the document is exposed to the light and scanned, and a sheet of paper is taken up from paper supply cassette 18 and fed to the print starting position.

The image of the document read by means of CCD line sensor 41 by exposing and scanning the document is stored into memory 82A via signal processor 82. Signal processor 82 creates image information corresponding to a yellow image or an image to be printed in yellow ink of ink ribbon 55 based on the image information stored in memory 82A, and supplies the same to head control section 84. Thermal head 52 of head control section 84 is driven according to the received image information. As a result, the image is printed on paper in yellow ink. At this time, gate 62 is driven as shown by a solid line in FIG. 4 and the paper having the image information printed thereon is fed along first guide 63 with the rear end thereof held between press roller 59 and platen roller 51.

After the printing operation using yellow ink is completed, thermal head 52 is set apart from platen roller 51 and the platen roller is rotated in a reverse direction to set the paper to the print starting position. At this time the front end of the paper is held between press roller 59 and platen roller 51. Gate 61 is driven as shown by broken lines in FIG. 4 and the rear end of the paper is received into second guide 64. When the paper is set at the print starting position, thermal head 52 is set in contact with platen roller 51.

In signal processor 82, image information corresponding to a magenta image or an image to be printed in magenta ink of ink ribbon 55 is created based on the image information stored in memory 82A. The newly created image information is supplied to thermal head 52 via control section 82 and head control section 84, and at the same time platen roller 51 and ink ribbon 55 are driven in a forward direction. As a result, the document image is printed in magenta ink on the paper on which an image has already been printed in yellow ink.

After this, the paper is set at the print starting position after each color ink is printed, and image information items corresponding to cyan and black inks are sequentially created. Then, based on the created image information items, the document images are sequentially printed in cyan and black inks respectively on the paper having the images printed thereon in yellow and magenta inks.

When the printing operation by black ink is completed, gate 62 is rotated to the position indicated by the broken lines in FIG. 4, so as to permit the paper on which all the necessary information has been printed to be discharged to paper discharging tray 16 by discharging roller 65.

The above color printing operation is disclosed in U.S. Pat. No. 4,663,637 and the detailed explanation thereof is omitted here.

Now, the image editing operation is explained.

Figure 8:
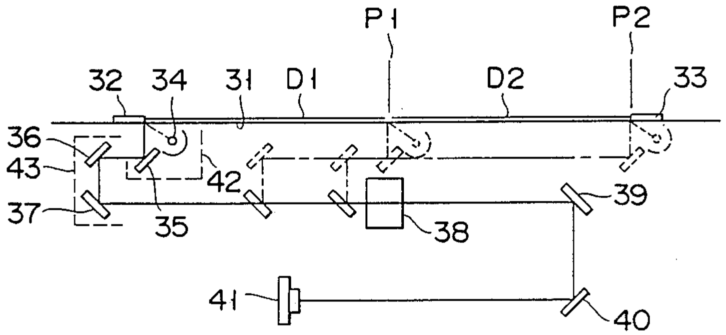
FIG. 8 is a diagram for illustrating the operation of the scanner unit.

As shown in FIG. 8, first document D1 to be edited and second document D2 used as a document source are set along scales 32 and 33 of document table 31. If, in this condition, mode key 74 of operation panel 15 is operated, the image editing mode is set.

Figure 9:
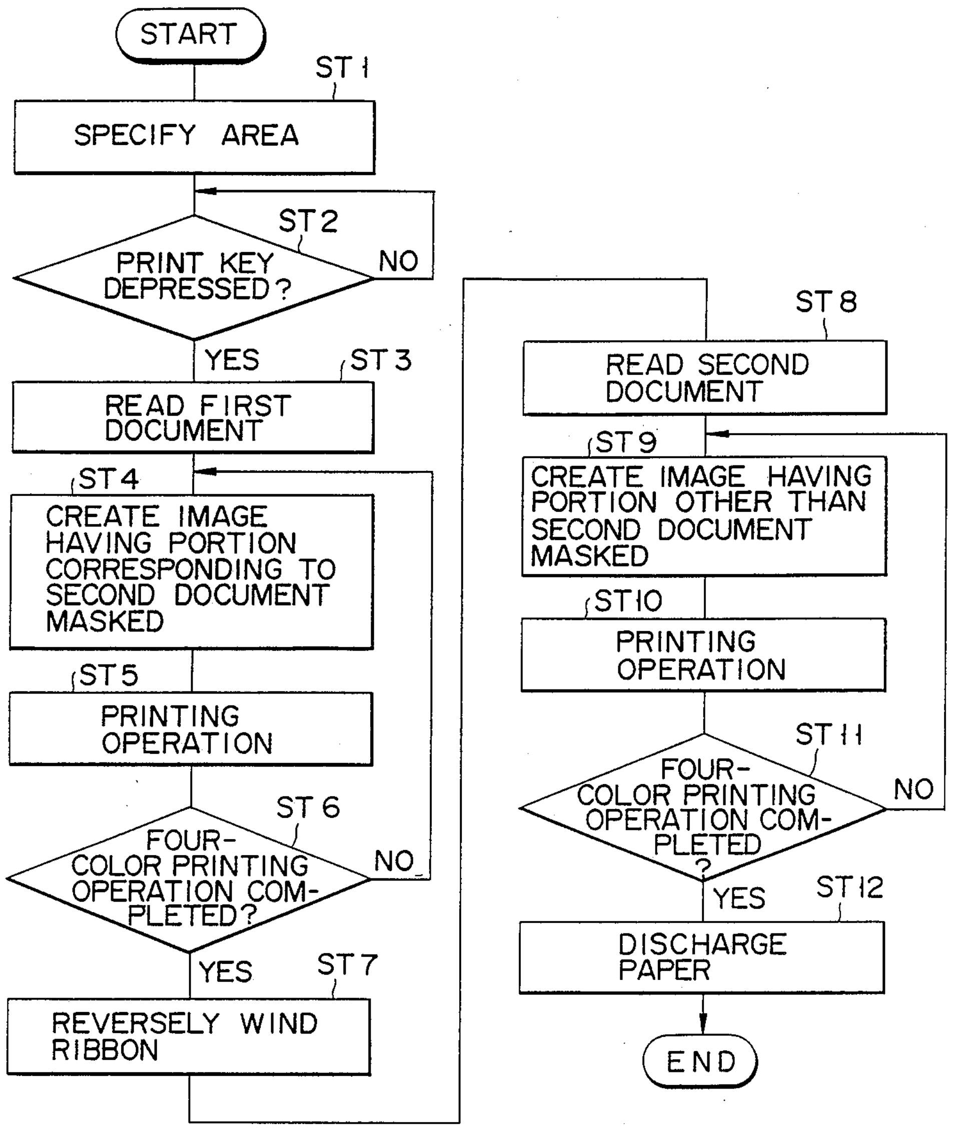
FIG. 9 is a flowchart for illustrating the image editing process.

FIG. 9 shows the operation of control section 81 in the image editing mode.

In the image editing mode, desired areas of first and second documents D1 and D2 set on document table 31 are specified (ST1). The areas are specified by use of ten keys 72 and determination key 75 of operation pane 15.

Figure 10:
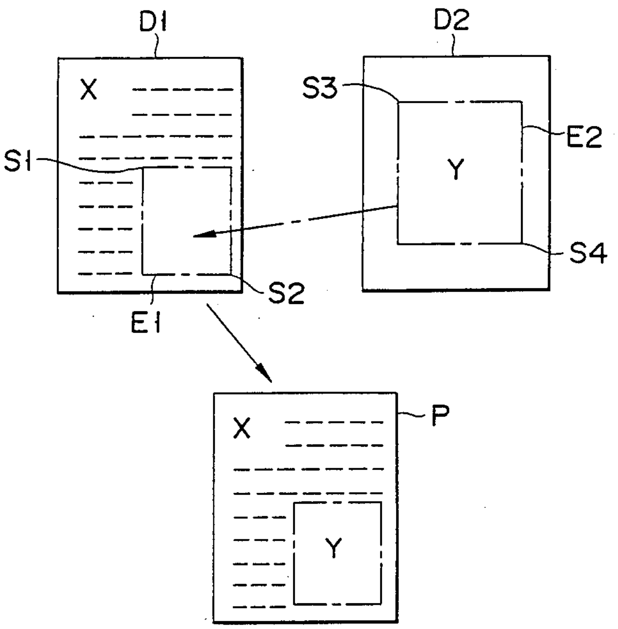
FIG. 10 is an illustration for explaining the image editing process.

For example, as shown in FIG. 10, when area E1 of first document D1 is specified, the coordinate values of point S1 on area E1 are first input by use of ten keys 72 and then determination key 75 is depressed to set the coordinate values of point S1 into memory 83. Next, the coordinate values of point S2 are input by use of ten keys 72, and then determination key 75 is depressed to set the coordinate values of point S2 into memory 83. When the same operation is effected to specify area E2 of document D2, the coordinate values of points S3 and S4 are entered into memory 83. When printing key 71 is depressed (ST2) in a condition that the desired areas are specified, motors 87, 89 and 90 are driven by motor control section 85 and exposure control section 86, and at the same time exposure lamp 34 is turned on and first document D1 is exposed to light and scanned to read the image of first document D1 by means of CCD sensor 41 (ST3). The read image information is stored into memory 82A of signal processor 82. Exposure lamp 34 and the like are stopped at position P1 shown in FIG. 8 after light exposure and the scanning operation for first document D1 has been completed.

In signal processor 82, image information corresponding to yellow ink is created based on the image information stored in memory 82A. At this time, a portion of the created image information which corresponds to specified area E1 is masked (ST4). The image information thus created is supplied to thermal head 52 via control section 81 and head control section 84 and the printing operation using yellow ink is effected as described before (ST5).

When the printing operation using yellow ink is completed, printing paper is set back to the print starting position and image information corresponding to an image to be printed in magenta ink is created in signal processor 82. The portion of the image information thus created which corresponds to specified area E1 is masked in the same manner as described before. The printing operation using magenta ink is effected based on the image information. After the printing operation using magenta ink has been completed, printing operations using cyan and black inks are sequentially effected in the same manner as described above (ST4, ST5, ST6).

Figure 11:
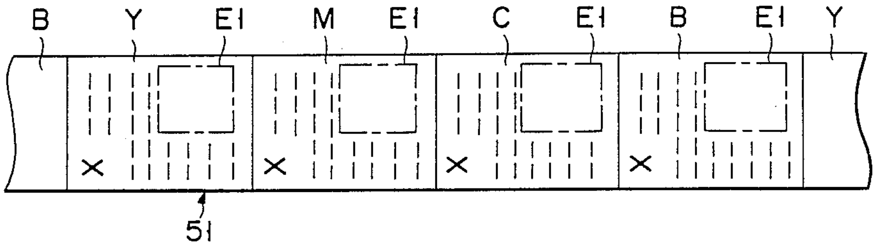
FIG. 11 is a plan view of an ink ribbon which has been subjected to the image editing process.

FIG. 11 shows ink ribbon 55 which has been subjected to the operation of printing the image of first document D1. The portion of each of color ink areas 55A to 55D of ink ribbon 55 which corresponds to area E1 of first document D1 is not used for the printing operation. Therefore, it is possible to use the ink of the above portion so as to print area E2 of second document D2.

When the operation for printing first document D1 using four different color inks is completed (ST6), the printing paper is set back to the print starting position and ink ribbon 55 is wound back by a distance corresponding to the four color areas so as to set yellow ink area 55A at the print starting position (ST7).

In this condition, in control section 81, the magnification data necessary for printing area E2 on area E1 is derived based on the specified coordinate values. Then, motor 88 is driven according to the derived magnification data by motor control section 85 to set variable magnification lens block 38 at a position so as to obtain the derived magnification data. After this, motors 87, 89 and 90 are driven by motor control section 85 and exposure control section 86 and at the same time exposure lamp 34 is turned on to subject second document D2 to the light-exposure and scanning operation, thus permitting CCD line sensor 41 to read the image of second document D2 (ST8). That is, as shown in FIG. 8, exposure lamp 34 and the like are moved from position P1 to position P2 to read the image of second document D2. The image information thus read is stored into memory 82A of signal processor 82.

In signal processor 82, image information corresponding to an image to be printed in yellow ink is created based on the image information stored in memory 82A. At this time, the portion of the created image information other than specified area E1 is masked (ST9). The image information thus created is supplied to thermal head 52 via control section 81 and head control section 84, and the printing operation using the yellow ink of that part of yellow ink area 55A which corresponds to area E1 is executed (ST10). When the printing operation using yellow ink is completed, the printing paper is set back to the print starting position, and image information corresponding to magenta ink is created in signal processor 82. The printing operation using ink of magenta ink area 55B is effected based on the image information in the same manner as described above (ST9, ST10). After the printing operation using the four color inks has been completed (ST11), the printing paper is discharged to paper discharging tray 16 (ST12), thus completing the image editing operation. As a result, as shown in FIG. 10, a reduced image of area E2 of second document D2 is printed in area E1 of first document D1 on paper P.

According to the above embodiment, after the image of first document D1 has been printed in the image editing operation, the ink ribbon is wound back by a distance corresponding to the four color ink areas required for printing second document D2 so that the portion of the wound-back ink ribbon which has not been used for printing first document D1 can be used for printing second document D2. Therefore, it is not necessary to use an ink ribbon corresponding to two sheets of paper in the printing operation, and an ink ribbon corresponding to one sheet of paper can be used to effect a desired printing operation, making it possible to use the ink ribbon efficiently.

In the above embodiment, a four-color ink ribbon is used, but the number of color ink areas is not limited to four.

Further, the document area specification is effected by operating the ten keys to input the coordinate values, but the document area specification can be attained by other methods. For example, a desired area of the document set on the document table can be directly specified by mounting spot light source which is movable along the lengthwise direction of exposure lamp 34 on a first carriage for holding exposure lamp 34 and moving the spot light source.

Further, various modifications can be made within the technical scope of this invention.

What is claimed is:

1. A thermal printer for printing an image by transferring ink from an ink ribbon to an object member, comprising;

means for designating a position in which a second image is printed on part of a first image;

means for modifying the first image by masking that part of the first image which corresponds to the printing position of the second image designated by the designating means; and means for printing the first image created by the modifying means by transferring ink to the object member and for printing the second image on the object member on which the first image has been printed, by using ink of that portion of the ink ribbon used for printing the first image which corresponds to the masked portion of the first image.

2. A thermal printer according to claim 1, wherein the printing means includes means for setting the ink ribbon back to the print starting position of the first image after the first image has been printed and before the second image is printed.

3. A thermal printer according to claim 1, wherein the printing means includes feeding means for setting the object member back to the print starting position of the first image, after the first image has been printed and before the second image is printed.

4. A thermal printer according to claim 1, wherein the ink ribbon includes a plurality of color ink areas which are sequentially arranged.

5. A thermal printer according to claim 1, wherein the ink ribbon includes a plurality of color ink areas which are sequentially arranged, and the modifying means includes processing means for creating first images for respective color inks.

6. A thermal printer according to claim 1, wherein the printing means includes means for changing the printing size of the second image.

7. A thermal printer for printing an image by transferring ink from an ink ribbon to an object member, comprising;

means for reading images of first and second documents;

means for designating desired portions of the first and second images;

first modifying means for modifying the first image read by the reading means by masking that part of the first image which corresponds to the portion designated by the designating means;

second modifying means for modifying the second image read by said reading means by masking a portion of the second image other than that part of the second image which is designated by the designated means; and means for printing the first image created by the first modifying means by transferring ink to the object member and for printing the second image created by the second modifying means on the object member on which the first image has been printed, by using ink of that portion of the ink ribbon used for printing the first image which corresponds to the masked portion of the first image.

8. A thermal printer according to claim 7, wherein the printing means includes means for setting the ink ribbon back to the print starting position of the first image after the first image has been printed and before the second image is printed.

9. A thermal printer according to claim 7, wherein the printing means includes feeding means for setting the object member back to the print starting position of the first image after the first image has been printed and before the second image is printed.

10. A thermal printer according to claim 7, wherein the ink ribbon includes a plurality of color ink areas which are sequentially arranged.

11. A thermal printer according to claim 7, wherein the ink ribbon includes a plurality of color in areas which are sequentially arranged and the first and second modifying means include processing means for creating first and second images for respective color inks.

12. A thermal printer according to claim 7, wherein the printing means includes means for changing the size of that portion of the second image which has been specified by the designating means, to coincide with the size of that portion of the first image which has been designated by the designating means.

13. A thermal printer according to claim 12, wherein the size changing means includes an optical lens system.

14. A printing method for printing an image on part of a printed image comprising the steps of;

designating a position in which a second image is printed on part of a first image;

modifying the first image by masking that part of the first image which corresponds to the printing position of the second image designated;

printing the first image created by transferring ink to an object member;

setting the object member and ink ribbon back to the print starting position of the first image; and printing the second image on the object member on which the first image has been printed by transferring ink of that portion of the ink ribbon used for printing the first image which corresponds to the masked portion of the first image to the object member.

* * * * *